United States Patent
Lee et al.

(10) Patent No.: US 7,687,949 B2
(45) Date of Patent: Mar. 30, 2010

(54) ROTOR OF SYNCHRONOUS RELUCTANCE MOTOR

(75) Inventors: Kyung-Hoon Lee, Seoul (KR); Jae-Yoon Oh, Gyeonggi-Do (KR); Jun-Ho Ahn, Seoul (KR); June-Hee Won, Seoul (KR); Dal-Ho Cheong, Seoul (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 11/913,691

(22) PCT Filed: May 12, 2005

(86) PCT No.: PCT/KR2005/001386
§ 371 (c)(1),
(2), (4) Date: Nov. 6, 2007

(87) PCT Pub. No.: WO2006/121225
PCT Pub. Date: Nov. 16, 2006

(65) Prior Publication Data
US 2008/0211340 A1    Sep. 4, 2008

(51) Int. Cl.
*H02K 21/12* (2006.01)
(52) U.S. Cl. .................... 310/83; 310/84; 310/156.53; 310/156.56; 310/156.39
(58) Field of Classification Search ................ 310/217, 310/83, 84, 156.39, 156.53, 156.56
See application file for complete search history.

(56) References Cited

U.S. PATENT DOCUMENTS

| | | | |
|---|---|---|---|
| 3,758,800 A | | 9/1973 | McLaughlin |
| 3,862,446 A | | 1/1975 | Hilgeman et al. |
| 5,363,004 A | * | 11/1994 | Futami et al. .......... 310/156.53 |
| 5,635,778 A | * | 6/1997 | Fujita et al. ................ 310/51 |
| 2002/0036436 A1 | * | 3/2002 | Koharagi et al. ....... 310/156.53 |
| 2003/0020351 A1 | * | 1/2003 | Lee et al. ............... 310/156.53 |
| 2003/0230948 A1 | * | 12/2003 | Murakami et al. ...... 310/156.53 |
| 2004/0150282 A1 | * | 8/2004 | Murakami et al. ...... 310/156.53 |
| 2005/0156474 A1 | * | 7/2005 | Endo ..................... 310/156.53 |
| 2005/0285468 A1 | * | 12/2005 | Fukushima et al. .... 310/156.53 |

(Continued)

FOREIGN PATENT DOCUMENTS

JP    02003333813    * 11/2003

(Continued)

OTHER PUBLICATIONS

International Search Report dated Mar. 9, 2009.

*Primary Examiner*—Quyen Leung
*Assistant Examiner*—Terrance Kenerly
(74) *Attorney, Agent, or Firm*—KED & Associates, LLP

(57) ABSTRACT

A rotor of a synchronous reluctance motor is provided. The rotor may include a laminated core including a plurality of laminated silicon steel sheets being equally divided into a plurality of regions with respect to a central portion of the plurality of silicon steel sheets. Each of the plurality of regions may include a plurality of barriers. Guide pin holes may be formed between adjacent regions so as to receive guide pins therethrough to align the plurality of silicon steel sheets and end caps provided at opposite ends thereof. Rivets may penetrate receiving holes formed at corresponding barriers in each of the respective regions so as to couple the laminated core and the end caps.

13 Claims, 5 Drawing Sheets

U.S. PATENT DOCUMENTS

2006/0055263 A1 3/2006 Kim et al.
2006/0061227 A1* 3/2006 Heideman et al. ...... 310/156.56
2006/0284512 A1 12/2006 Lee et al.
2007/0247012 A1 10/2007 Shin et al.

FOREIGN PATENT DOCUMENTS

KR 10-2004-0074734 8/2004

* cited by examiner

ROTOR OF SYNCHRONOUS RELUCTANCE MOTOR

TECHNICAL FIELD

The present invention relates to a rotor of a synchronous reluctance motor having an improved coupling structure between a laminated core and end plates.

BACKGROUND ART

In general, a synchronous reluctance motor is such motor for generating a torque of a motor using a reluctance, which is broadly being used in compressors.

An end plate provided with a balance weight is coupled to both sides of a laminated core of the synchronous reluctance motor to prevent a rotor from being eccentric. When a compressor has a larger capacity, the weight of the balance weight is increased. As a result, aligning the laminated core and increasing the coupling force between the laminated core and the balance weight have been considered as important tasks for improving reliability of products.

FIG. 1 is a disassembled perspective view showing a rotor of a conventional synchronous reluctance motor, FIG. 2 is an assembled perspective view showing the rotor of the conventional synchronous reluctance motor, FIG. 3 is a plane view showing a laminated core in the rotor of the conventional synchronous reluctance motor, and FIG. 4 is a sectional view taken along the line I-I of FIG. 2.

As shown in those drawings, the rotor 10 of the conventional synchronous reluctance motor includes a laminated core 1 formed by laminating a plurality of silicon steel sheet 7, end plates 3 fixed to both sides of the laminated core 1, and a balance weight 2 formed on each end plate 3.

An axial hole 1a is formed in the center of the laminated core 1, and a key groove 1b is formed in an inner circumferential surface of the axial hole 1a. A barrier 8 is formed in each region equally divided by 90° on the basis of the center of the laminated core 1. The barrier 8 has a plurality of holes 8a. A rivet hole 1c is formed between two barriers 8.

An axial hole 3a is also formed in the center of each end plate 3, and a key groove 3b is formed in an inner circumferential surface of the axial hole 3a.

Each rivet hole 3c is formed in a periphery of the axial hole 3a of the end plate 3 at a uniform interval to correspond to each rivet hole 1c of the laminated core 1.

A rivet 4 penetrates the rivet hole 1c of the laminated core 1, and one end 4b of the rivet 4 is inserted into the rivet hole 3c of the end plate 3. The one end 4b of the rivet 4 is thereafter riveted. Therefore, the two end plates 3 are coupled to both sides of the laminated core 1 by the rivet 4.

A procedure for assembling such constructed rotor of the conventional synchronous reluctance motor will now be explained.

The one end 4b of the rivet 4 is inserted into the rivet hole 3c of the lower end plate 3 of the two end plates. The one end 4b of the rivet 4 is then inserted into the rivet hole 1c of the laminated core 1, thereby laminating the plurality of silicon steel sheets 7.

Here, the silicon steel sheets 7 are laminated in a state that a gauge bar 20 having keys 21 at its outer circumferential surface is inserted into the axial hole 1a of the laminated core 1 so as to align the laminated core 1 on the straight line.

Next, the one end 4b of the rivet 4 is inserted into the rivet hole 3c of the upper end plate 3 and an end of the gauge bar 20 is coupled with a nut 22. As a result, the end plates 3 are closely adhered with both sides of the laminated core 1.

An air layer (not shown) positioned between the silicon steel sheets 7 is removed by coupling the nut 22 to the end of the gauge bar 20. Thereafter, the one end 4b of the rivet 4 is riveted. The nut 22 is unscrewed again to separate the gauge bar 20 from the axial holes 1a and 3a, and accordingly the rotor 10 is completely assembled.

However, in such constructed rotor of the conventional synchronous reluctance motor, key grooves are formed in the inner circumferential surfaces of the axial holes of the end plates and the laminated core should be formed to align the laminated core and the keys of the gauge bar should individually be fixed into the key grooves, which makes it more difficult to align the laminated core.

In addition, if an outer diameter of the rotor is increased to maximize an output of the synchronous reluctance motor, the weight of the balance weight is also increased in order to improve the coupling force between the laminated core and the balance weight. However, in the rotor of the conventional synchronous reluctance motor, the laminated core and the balance weight are coupled to each other only using the rivet and the rivet hole is positioned in the periphery of the axial hole. As a result, the coupling force is maintained by the one end and the head of the rivet, which results in decrease of the coupling force therebetween.

DISCLOSURE OF THE INVENTION

Therefore, an object of the present invention is to provide a rotor of a synchronous reluctance motor capable of improving assembly characteristics by easily aligning a laminated core by a first fixing point, a second fixing point, and a guide pin.

Another object of the present invention is to provide a rotor of a synchronous reluctance motor capable of ensuring reliability of products by maximizing a coupling force between a laminated core and end plates.

To achieve these and other advantages and in accordance with the purpose of the present invention, as embodied and broadly described herein, there is provided a rotor of a synchronous reluctance motor comprising: a laminated core formed by laminating a plurality of silicon steel sheets, having barriers in each region equally divided on the basis of the center of each silicon steel sheet, and guide pin holes between each barrier; end plates fixed onto both sides of the laminated core; a balance weight provided at one side of each end plate; a guide pin inserted into each guide pin hole; and a rivet installed by penetrating each barrier to couple the laminated core and each end plates.

Preferably, a guide pin fixing groove into which an end of the guide pin is inserted is formed in a side surface of the end plate.

Preferably, a rivet support unit for supporting the rivet is formed in an inner circumferential surface of each barrier.

Preferably, a first fixing point is formed on a virtual axis (D axis) which is formed between barriers and extending from the center of the laminated core, and a second fixing point is formed on a virtual axis (Q axis) extending from the center of the laminated core to the rivet support unit and formed in each barrier.

Preferably, the end plates, the guide pin and the rivet are formed of a magnetic material so as to be magnetically independent of the laminated core.

The foregoing and other objects, features, aspects and advantages of the present invention will become more apparent from the following detailed description of the present invention when taken in conjunction with the accompanying drawings.

MODES FOR CARRYING OUT THE PREFERRED EMBODIMENTS

Reference will now be made in detail to the preferred embodiments of the present invention, examples of which are illustrated in the accompanying drawings.

A rotor of a synchronous reluctance motor according to the present invention will be explained in more detail with reference to the attached drawings.

Figure 1:
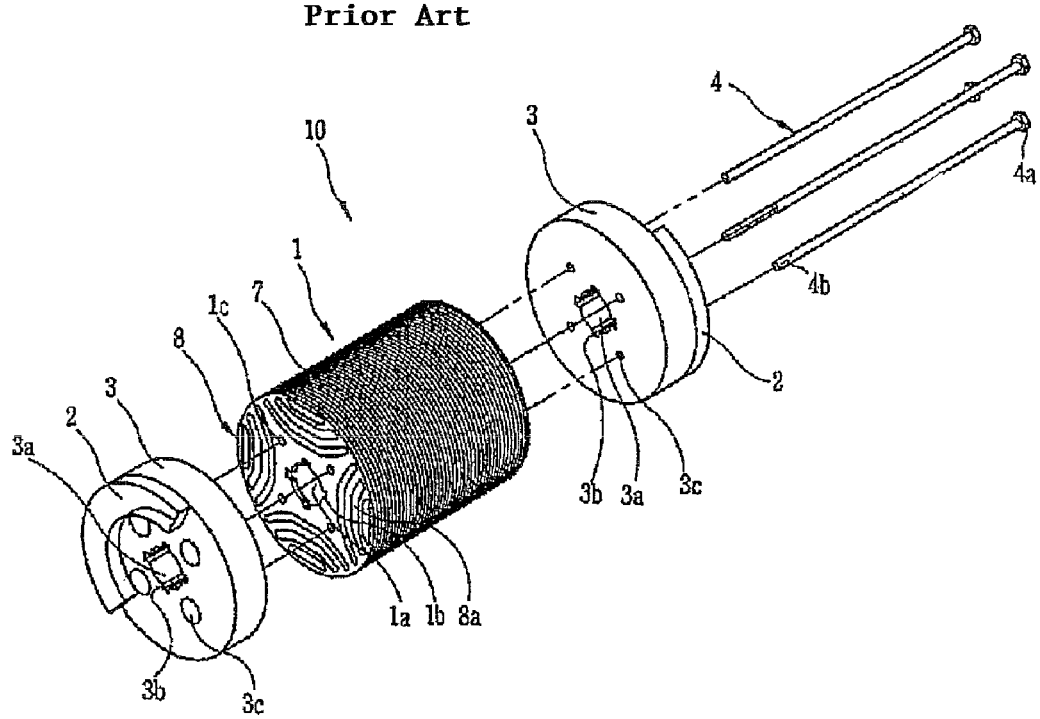
FIG. 1 is a disassembled perspective view showing a rotor of a conventional synchronous reluctance motor.
Figure 2:
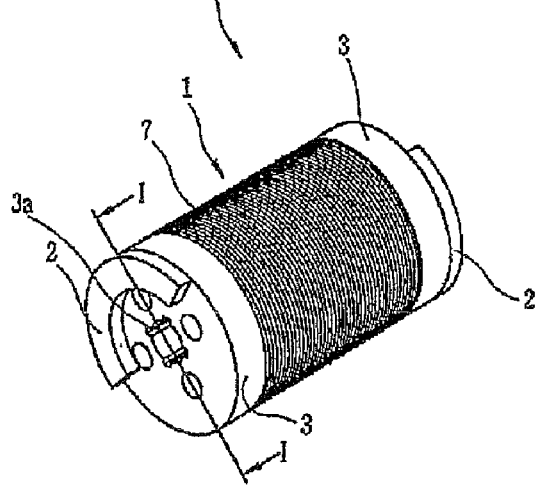
FIG. 2 is an assembled perspective view showing the rotor of the conventional synchronous reluctance motor.
Figure 3:
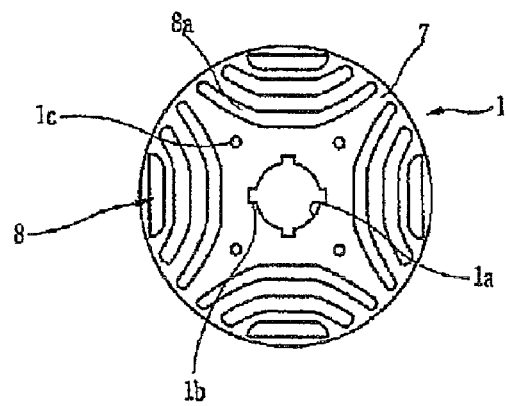
FIG. 3 is a plane view showing a laminated core in the rotor of the conventional synchronous reluctance motor.
Figure 4:
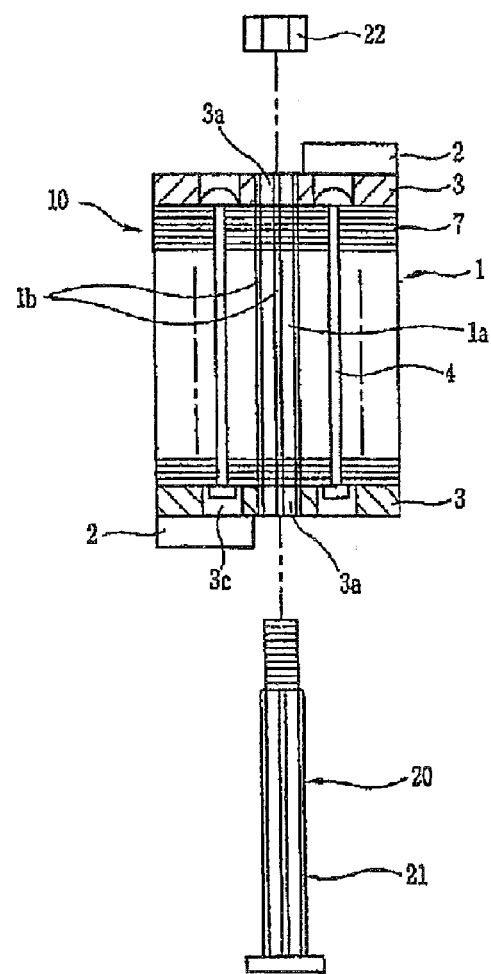
FIG. 4 is a sectional view taken along the line I-I of FIG. 2.
Figure 5:
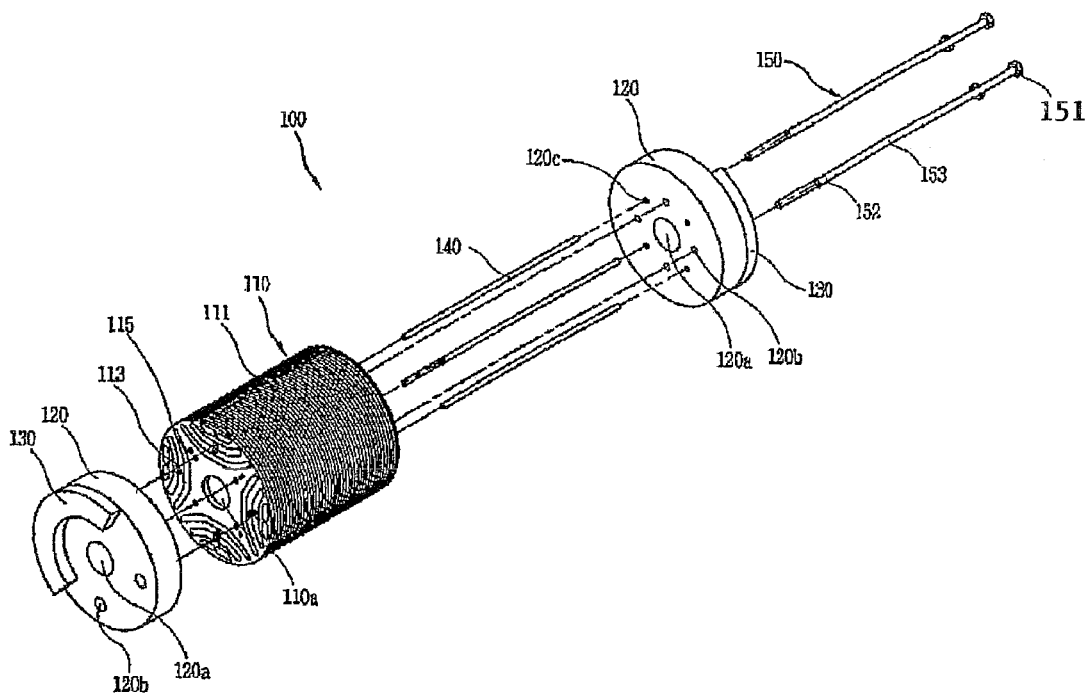
FIG. 5 is a disassembled perspective view showing a rotor of a synchronous reluctance motor according to the present invention.
Figure 6:
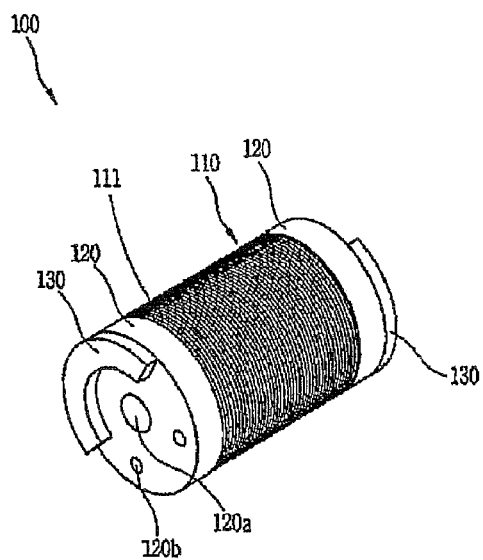
FIG. 6 is an assembled perspective view showing the rotor of the synchronous reluctance motor according to the present invention.
Figure 7:
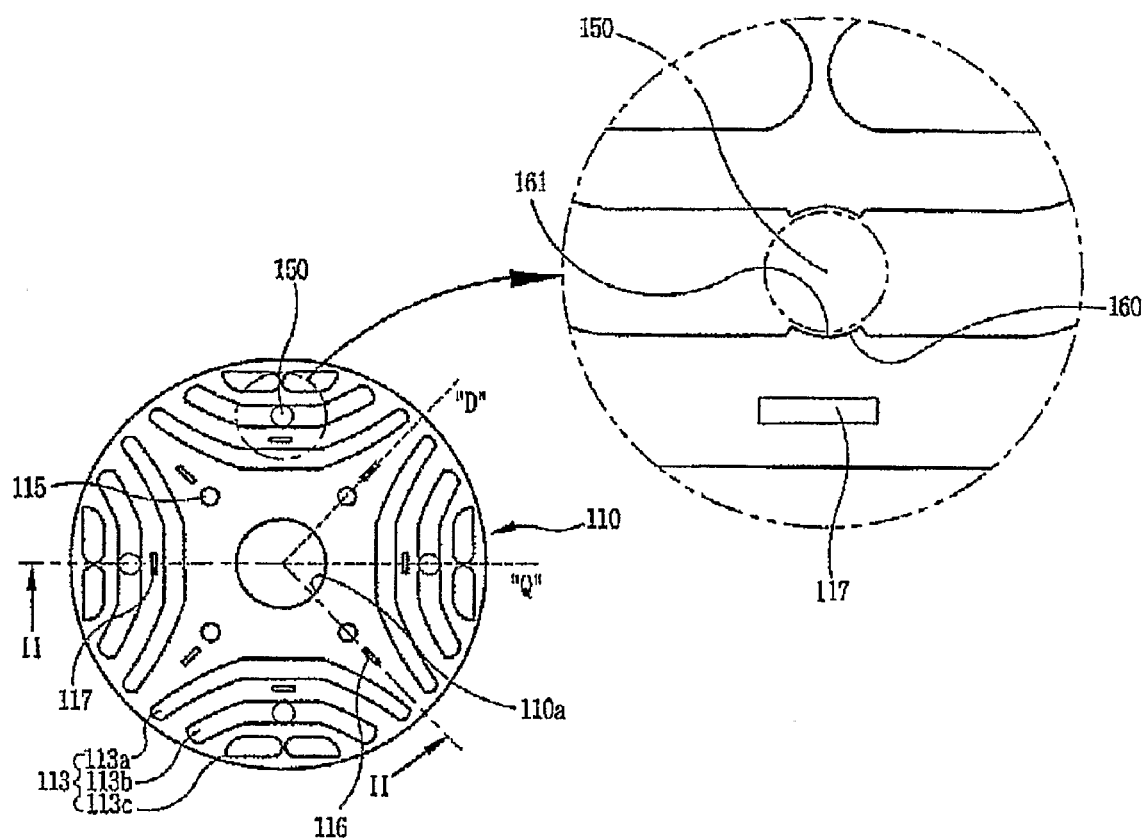
FIG. 7 is a plane view showing a laminated core in the rotor of the synchronous reluctance motor according to the present invention.
Figure 8:
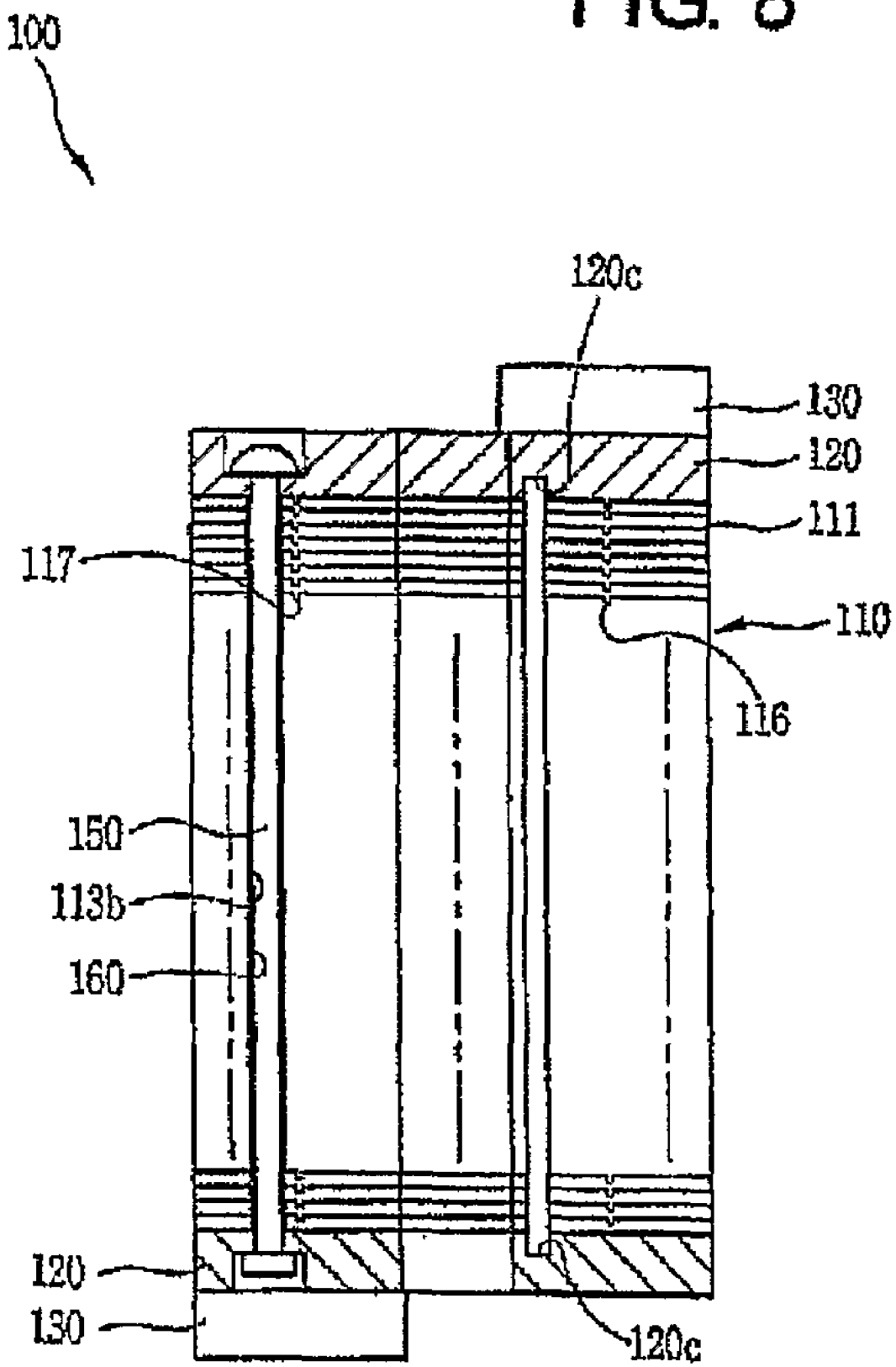
FIG. 8 is a sectional view taken along the line II-II of FIG. 7.

FIG. 5 is a disassembled perspective view showing a rotor of a synchronous reluctance motor according to the present invention, FIG. 6 is an assembled perspective view showing the rotor of the synchronous reluctance motor according to the present invention, FIG. 7 is a plane view showing a laminated core in the rotor of the synchronous reluctance motor according to the present invention, and FIG. 8 is a sectional view taken along the line II-II of FIG. 7.

As shown, a rotor of a synchronous reluctance motor according to the present invention 100 comprises a laminated core 110 formed as a plurality of silicon steel sheets 111 are laminated, having a barrier 113 formed at each region equally divided on the basis of the center of each silicon steel sheet 111, and having guide pin holes 115 between the barriers 113, an end plate 120 fixed at both sides of the laminated core 110, a balance weight 130 formed at one side of each end plate 120, a guide pin 140 inserted into each guide pin hole 115, and a rivet 150 penetrating a hole 113b of each barrier 113 for coupling the laminated core 110 to the end plate 120.

An axial hole 110a is formed at the center of the laminated core 110, and the barrier 113 is formed at four regions uniformly divided by 90° on the basis of the center of the laminated core 110. Also, a plurality of holes 113a, 113b, and 113c are formed at the barrier 113.

An axial hole 120a is formed at the center of the end plate 120, and a rivet support unit 160 for supporting the rivet 150 is formed at an inner circumferential surface of the hole 113b of the barrier 113.

More specifically, two rivet support units 160 facing each other are formed at the inner circumferential surface of the hole 113b of the barrier 113, and an arc-shaped mounting groove 161 is formed at each rivet support unit 160. Accordingly, a virtual space formed by the two mounting grooves 161 serves as the conventional rivet hole, and thus a body 153 of the rivet 150 is firmly supported by the rivet support unit 160 and a head 151 and an end 152 of the rivet 150 are riveted, thereby more firmly coupling the laminated core 110 to the end plate 120.

When the rivet 150 is supported by the rivet support unit 160, the laminated core 110 and the end plate 120 are supported not only by the end 152 and the head 151 of the rivet 150 but also by the body 153 of the rivet 150, that is, a part contacting the rivet support unit 160 thereby to have a higher coupling force.

When the rotor is rotated with a high speed, a force is applied to the laminated core 110 in a radius direction by a centrifugal force. Since the rivet 150 is supported by the rivet support unit 160, a force applied to the laminated core 110 is partially distributed to the rivet 150 thereby to prevent the laminated core 110 from being deformed.

In case that the rivet 150 is positioned at a first hole 113a or a third hole 113c, a coupling point between the laminated core 110 and the end plate 120 is positioned at the center of the laminated core 110 or an outer circumference of the laminated core 110 and thereby a coupling force is non-uniformly generated. Accordingly, the rivet 150 is preferably positioned at a second hole (113b) among the three holes of each barrier 113.

Each guide pin 140 is inserted into each guide pin hole 115, and an end of the guide pin 140 is inserted into or penetrates a guide pin fixing groove 120c formed at one surface of the end plate 120. The guide pin 140 not only aligns the plurality of silicon steel sheet 111 but also enhances a coupling force between the laminated core 110 and the end plate 120 at the time of assembling the laminated core.

A first fixing point 116 is formed on a virtual axis D formed between the barriers 113 and extending to the center of the laminated core 110. Also, a second fixing point 117 is formed on a virtual axis Q extending from the center of the laminated core 110 towards the rivet support unit 160, and is formed in the barrier 113.

The first fixing point 116 and the second FIXING point 117 align the plurality of silicon steel sheets 111 at the time of assembling the laminated core 110, thereby enhancing an assembly characteristic.

The end plate 120, the guide pin 140, and the rivet 150 are preferably formed of a non-magnetic material so as to be magnetically independent from the laminated core 110 in order to prevent a flux leakage due to a flux path.

An assembly of the rotor of the synchronous reluctance motor and an operation effect thereof will be explained in more detail.

The first fixing point 116 and the second fixing point 117 formed at each silicon steel sheet 111 are made to be consistent to each other thereby to align the laminated core 110. Under the state, the guide pin 140 is inserted into the guide pin hole 115 and then the end plate 120 is adhered to both sides of the laminated core 110. At this time, both ends of the guide pin 140 are inserted into the fixing groove 120c.

The silicon sheets 111 are arranged as a straight line by the first FIXING point 116, the second fixing point 117, and the guide pin 140. The guide pin 140 enhances the straight-line arrangement of the silicon steel sheets 111 and enhances a coupling force between the laminated core 110 and the end plate 120.

Then, the end 152 of the rivet 150 is sequentially inserted into a rivet hole 120b of the lower end plate 120, the mounting groove 161 formed at the second hole 113b of the barrier 113 of the laminated core 110, and the rivet hole 120b of the upper end plate 120.

Under the body 153 of the rivet 150 is supported by the rivet support unit 160, the end 152 of the rivet 150 is riveted to firmly couple the laminated core 110 to the end plate 120 thereby completing the assembly of the rotor.

As aforementioned, when the rivet 150 is supported by the rivet support unit 160, the laminated core 110 and the end plate 120 are supported not only by the end 152 and the head 151 of the rivet 150 but also by the body 153 of the rivet 150, that is, a part contacting the rivet support unit 160 thereby to have a higher coupling force.

When the rotor 100 is rotated with a high speed, a force is applied to the laminated core 110 in a radius direction by a centrifugal force. Since the rivet 150 is supported by the rivet support unit 160, a force applied to the laminated core 110 is partially distributed to the rivet 150 thereby to prevent the laminated core 110 from being deformed.

In the present invention, the laminated core can be easily aligned by the first FIXING point, the second FIXING point, and the guide pin, thereby enhancing the assembly characteristic.

Also, since the end of the guide pin is fixed to the end plate and the rivet is supported by the rivet support unit formed at the inner circumferential surface of the hole of the barrier, the coupling force between the laminated core and the end plate is maximized. Accordingly, the rotor of the synchronous reluctance motor of the present invention can be effectively applied to a compressor of a large capacity.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A rotor of a synchronous reluctance motor, comprising:
a laminated core, comprising:
a plurality of stacked silicon steel sheets, wherein each of the plurality of silicon steel sheets is equally divided into a plurality of regions with respect to a center of each of the plurality of silicon steel sheets such that the laminated core is also divided into the plurality of regions;
a plurality of barriers including first, second and third holes formed within each of the plurality of regions; and
guide pin holes formed between adjacent regions of each of the plurality of silicon steel plates;
end plates fixed to opposite ends of the laminated core;
guide pins that extend through each of the guide pin holes and having each of two opposite ends thereof coupled to a respective end plate so as to align the plurality of stacked silicon steel sheets; and
at least one rivet that couples the laminated core and the end plates, wherein the at least one rivet extends through a receiving portion of the second hole formed in a corresponding one of the plurality of regions in each of the plurality of silicon steel sheets, and wherein the at least one rivet is supported within the receiving portion of the second hole by a rivet support unit, wherein the rivet support unit comprises a first protrusion that extends from a first inner peripheral surface of the second hole toward a central portion of the second hole and a second protrusion that extends from a second inner peripheral surface of the second opposite the first inner peripheral surface toward the central portion of the second hole so as to support a body portion of the at least one rivet therebetween.

2. A rotor of a synchronous reluctance motor, comprising:
a laminated core comprising a plurality of silicon steel sheets, wherein the laminated core comprises a plurality of regions equally divided based on a center of each of the plurality of silicon steel sheets, each of the plurality of regions comprising a plurality of barriers each including first, second and third holes, and wherein a guide pin hole is formed between each pair of adjacent regions;
end plates fixed to opposite ends of the laminated core;
a balance weight coupled to a first side of each of the end plates;
a guide pin that extends through each of the guide pin holes;
a rivet that extends through a corresponding barrier of each of the plurality of silicon steel plates so as to couple the laminated core and the end plates, wherein a rivet support unit is formed as a pair of protrusions that extend from opposite inner peripheral surfaces of the second hole of each of the corresponding barriers toward a central portion of the second hole so as to support a body portion of the rivet extending therethrough.

3. The rotor of claim 2, further comprising a guide pin fixing groove formed at a second side of each of the end plates, wherein each guide pin fixing groove receives a corresponding end of a respective guide pin.

4. The rotor of claim 2, wherein the pair of protrusions of the rivet support unit comprises a first arc shaped groove formed on a first inner peripheral surface of the barrier and a second are shaped groove formed on a second inner peripheral surface or the barrier opposite the first inner peripheral surface so as to receive and support an outer circumferential surface of the body portion of the rivet.

5. The rotor of claim 4, further comprising:
a first fixing point provided on a first axis, wherein the first axis is defined by a first line that extends between the central portion of the laminated core to an area between adjacent regions of the plurality of regions; and
a second fixing point provided on a second axis, wherein the second axis is defined by a second line that extends from the central portion of the laminated core to the rivet support unit, and wherein the second fixing point is formed between adjacent barriers within one of the plurality of regions.

6. The rotor of claim 2, wherein the end plate, the guide pin and the rivet are formed of a non-magnetic material in order to be magnetically independent from the laminated core.

7. A rotor of a synchronous reluctance motor, comprising:
a laminated core comprising a plurality of laminated silicon steel sheets and having a plurality of regions equally divided with respect to a center of the plurality of silicon steel sheets, each of the plurality of regions having a plurality of barriers each including first, second and third holes formed therein;
end plates fixed to opposite ends of the laminated core;
a rivet that extends through the end plates and the laminated core so as to couple the laminated core and the end plates; and
a rivet support unit comprising a rivet support portion provided at the second hole of a corresponding barrier of each of the plurality of silicon steel plates, each rivet support portion comprising protrusions that extend from opposite inner peripheral surfaces of the second hole of the corresponding barrier toward a central portion of the second hole so as to define a receiving portion of the second hole in which the rivet is supported.

8. A rotor of a synchronous reluctance motor, comprising:

a laminated core comprising a plurality of silicon steel sheets and having a plurality of regions equally divided with respect to a center of each of the silicon steel sheets, each of the plurality of regions comprising a plurality of barriers formed therein, wherein each barrier includes first, second and third holes and each of the plurality of regions includes a receiving portion formed in the second hole thereof;

end plates fixed to opposite ends of the laminated core;

a balance weight provided at a first side of each of the end plates;

a rivet that penetrates the receiving hole formed in each region so to couple the laminated core and the end plates; and a rivet support unit comprising a pair of protrusions that extend from opposite inner circumferential surfaces of the receiving portion of the second hole toward a central portion of the second hole so as to support the rivet extending therethrough.

9. The rotor of claim 8, further comprising:

a first fixing point provided on a first axis, wherein the first axis is defined by a first line that extends between the central portion of the laminated core to an area between adjacent regions of the plurality of regions; and a second fixing point provided on a second axis, wherein the second axis is defined by a second line that extends from the central portion of the laminated core to the rivet support unit, and wherein the second fixing point is formed between adjacent barriers within one of the plurality of regions.

10. The rotor of claim 8, wherein the end plate and the rivet are formed of a non-magnetic material in order to be magnetically independent from the laminated core.

11. The rotor of claim 1, wherein the at least one rivet comprises a plurality of rivets, wherein each rivet of the plurality of rivets extends through a corresponding receiving portion formed in a corresponding second hole of a corresponding barrier in each of the plurality of regions, and a rivet support unit is provided at each receiving portion so as to support a respective rivet therein.

12. The rotor of claim 1, wherein a cross sectional shape of the rivet support unit corresponds to a cross sectional shape of the at least one rivet extending therethrough.

13. The rotor of claim 1, wherein the first and second protrusions are each arc shaped so as to conform to a corresponding outer circumferential portion of the body portion of the at least one rivet.

* * * * *